(12) United States Patent
Rahman

(10) Patent No.: US 10,887,816 B2
(45) Date of Patent: *Jan. 5, 2021

(54) RADIO ACCESS NETWORK RESOURCE CONFIGURATION FOR GROUPS OF MOBILE DEVICES

(71) Applicant: AT&T Intellectual Property I, L.P., Atlanta, GA (US)

(72) Inventor: Moshiur Rahman, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/780,220

(22) Filed: Feb. 3, 2020

(65) Prior Publication Data

US 2020/0178146 A1 Jun. 4, 2020

Related U.S. Application Data

(63) Continuation of application No. 16/126,925, filed on Sep. 10, 2018, now Pat. No. 10,555,235, which is a
(Continued)

(51) Int. Cl.
*H04W 52/36* (2009.01)
*H04W 16/12* (2009.01)
(Continued)

(52) U.S. Cl.
CPC ........... *H04W 36/32* (2013.01); *H04W 24/02* (2013.01); *H04W 36/04* (2013.01); *H04W 36/14* (2013.01);
(Continued)

(58) Field of Classification Search
CPC . H04W 52/36; H04W 87/2123; H04W 16/12; H04W 24/00; H04W 36/30;
(Continued)

(56) References Cited

U.S. PATENT DOCUMENTS 5,487,185 A * 1/1996 Halonen ............... H04W 52/36
455/561
5,526,348 A * 6/1996 Ichiyoshi ............. H04B 7/2123
370/344

(Continued)

FOREIGN PATENT DOCUMENTS

EP 1 885 141 A1 2/2008
EP 2 781 112 A4 12/2015
(Continued)

*Primary Examiner* — William D Cumming

(57) ABSTRACT

A device, computer-readable medium, and method for activating antennas based upon a location and a movement of a group of mobile endpoint devices are disclosed. For example, a method may include a processor of a cellular network detecting a group of mobile endpoint devices associated with a first location and activating a first antenna at a first cell site of the cellular network associated with the first location, in response to detecting the group of mobile endpoint devices. The processor may further detect a movement of the group of mobile endpoint devices toward a second location, and activate a second antenna at a second cell site of the cellular network associated with the second location and deactivate the first antenna, in response to detecting the movement of the group of mobile endpoint devices toward the second location.

20 Claims, 4 Drawing Sheets

Related U.S. Application Data continuation of application No. 15/670,821, filed on Aug. 7, 2017, now Pat. No. 10,075,890, which is a continuation of application No. 15/222,697, filed on Jul. 28, 2016, now Pat. No. 9,730,135.

(51) Int. Cl.

| | | |
|---|---|---|
| *H04W 24/00* | (2009.01) | |
| *H04W 36/30* | (2009.01) | |
| *H04W 88/08* | (2009.01) | |
| *H04W 48/20* | (2009.01) | |
| *H04W 36/32* | (2009.01) | |
| *H04W 64/00* | (2009.01) | |
| *H04W 24/02* | (2009.01) | |
| *H04W 36/04* | (2009.01) | |
| *H04W 36/14* | (2009.01) | |
| *H04W 72/04* | (2009.01) | |
| *H04W 36/00* | (2009.01) | |

(52) U.S. Cl.
CPC ........... *H04W 64/00* (2013.01); *H04W 72/04* (2013.01); *H04W 36/0009* (2018.08); *H04W 72/048* (2013.01)

(58) Field of Classification Search
CPC . H04W 12/001; H04W 48/20; H04W 88/085; H04W 88/08; H04W 36/04; H04W 28/08; H04W 88/05
USPC ............. 455/561, 26.1, 63.1, 1, 436, 69, 73, 455/452.2; 370/330, 252, 332, 342
See application file for complete search history.

(56) References Cited

U.S. PATENT DOCUMENTS

| | | | | |
|---|---|---|---|---|
| 5,570,352 A * | 10/1996 | Poyhonen | ............. | H04W 16/12 370/330 |
| 5,572,510 A * | 11/1996 | Koivu | .................. | H04W 24/00 370/252 |
| 5,649,290 A * | 7/1997 | Wang | .................... | H04W 36/30 370/332 |
| 5,826,171 A * | 10/1998 | Franke | .................. | H04W 88/08 455/26.1 |
| 5,832,368 A * | 11/1998 | Nakano | ................. | H04W 48/20 455/63.1 |
| 5,933,424 A * | 8/1999 | Muto | ........................ | H04L 1/22 370/342 |
| 6,058,317 A * | 5/2000 | Posti | .................... | H04W 88/085 455/561 |
| 6,067,583 A * | 5/2000 | Gilbert | .................... | H04B 1/38 455/1 |
| 6,119,004 A * | 9/2000 | Yamada | ................ | H04W 88/08 455/436 |
| 6,125,278 A | 9/2000 | Wieczorek et al. | | |
| 6,218,987 B1 * | 4/2001 | Derneryd | ............. | H01Q 1/246 342/373 |
| 6,804,500 B2 * | 10/2004 | Yamaguchi | ............ | H01L 24/49 330/124 R |
| 7,542,725 B2 * | 6/2009 | Ishida | ..................... | H04B 7/08 455/69 |
| 7,768,952 B2 | 8/2010 | Lee | | |
| 7,787,402 B2 | 8/2010 | Lee | | |
| 7,916,080 B2 | 3/2011 | Lee | | |
| 8,200,244 B2 | 6/2012 | Levin et al. | | |
| 8,385,220 B2 | 2/2013 | Ryan | | |
| 8,400,954 B2 | 3/2013 | Lee | | |
| 8,521,223 B2 | 8/2013 | Bajj et al. | | |
| 8,543,121 B2 | 9/2013 | Ryan | | |
| 8,755,804 B2 | 6/2014 | Lee | | |
| 8,855,625 B2 | 10/2014 | Tipton et al. | | |
| 8,874,133 B2 | 10/2014 | Flanagan et al. | | |
| 8,908,507 B2 | 12/2014 | Kovvali et al. | | |
| 8,971,300 B2 | 3/2015 | Lee | | |
| 8,989,099 B2 | 3/2015 | El-saidny et al. | | |
| 9,001,682 B2 | 4/2015 | Kovvali et al. | | |
| 9,026,140 B2 | 5/2015 | Siomina et al. | | |
| 9,031,561 B2 | 5/2015 | Nuss et al. | | |
| 9,241,289 B1 | 1/2016 | Oroskar et al. | | |
| 9,253,721 B2 | 2/2016 | Li et al. | | |
| 9,282,588 B2 | 3/2016 | Novak et al. | | |
| 9,392,471 B1 | 7/2016 | Thomas et al. | | |
| 9,456,303 B2 | 9/2016 | Johnson | | |
| 9,730,135 B1 * | 8/2017 | Rahman | ................ | H04W 64/00 |
| 9,887,800 B2 | 2/2018 | Johnson | | |
| 10,075,890 B2 * | 9/2018 | Rahman | ................ | H04W 36/32 |
| 10,091,662 B1 * | 10/2018 | Bendlin | ................ | H04W 24/02 |
| 10,278,081 B2 * | 4/2019 | Cotanis | ................ | H04W 24/10 |
| 10,416,683 B2 * | 9/2019 | Adriazola | ............ | G05D 1/0094 |
| 10,470,078 B2 * | 11/2019 | Murphy | ................ | H04W 16/24 |
| 10,555,235 B2 * | 2/2020 | Rahman | ................ | H04W 36/04 |
| 10,575,276 B1 * | 2/2020 | Mappus | ............... | H04W 64/006 |
| 10,602,370 B2 * | 3/2020 | Bendlin | ............... | H04W 24/02 |
| 2001/0014588 A1 * | 8/2001 | Ishida | ..................... | H04B 7/08 455/69 |
| 2001/0029168 A1 * | 10/2001 | Yamaguchi | ........... | H03F 1/0283 455/73 |
| 2005/0024136 A1 * | 2/2005 | Yamaguchi | ............... | H03F 3/72 330/124 R |
| 2006/0009233 A1 | 1/2006 | Feldman et al. | | |
| 2009/0285331 A1 | 11/2009 | Sugar et al. | | |
| 2011/0287784 A1 | 11/2011 | Levin et al. | | |
| 2012/0040664 A1 | 2/2012 | Kamdar | | |
| 2012/0127922 A1 | 5/2012 | Feher | | |
| 2012/0281741 A1 | 11/2012 | Feher | | |
| 2013/0143588 A1 | 6/2013 | Flanagan et al. | | |
| 2014/0269364 A1 | 9/2014 | Knapp et al. | | |
| 2014/0334374 A1 | 11/2014 | Hyde et al. | | |
| 2015/0098393 A1 | 4/2015 | Tofighbakhsh et al. | | |
| 2015/0319563 A1 | 11/2015 | Johnson | | |
| 2015/0334042 A1 * | 11/2015 | Katayama | ........... | H04L 12/4641 455/452.2 |
| 2016/0028441 A1 | 1/2016 | Lee | | |
| 2016/0127169 A1 | 5/2016 | Rosa de Sousa Teixeira et al. | | |
| 2016/0127923 A1 | 5/2016 | Matsunaga et al. | | |
| 2016/0165472 A1 | 6/2016 | Gopalakrishnan et al. | | |
| 2016/0380718 A1 | 12/2016 | Johnson | | |
| 2017/0225321 A1 | 8/2017 | Deyle et al. | | |
| 2017/0225332 A1 | 8/2017 | Deyle et al. | | |
| 2017/0225334 A1 | 8/2017 | Deyle et al. | | |
| 2017/0225336 A1 | 8/2017 | Deyle et al. | | |
| 2017/0245176 A1 * | 8/2017 | Murphy | ................ | H04W 28/08 |
| 2017/0311183 A1 * | 10/2017 | Cotanis | ................ | H04L 41/12 |
| 2018/0002010 A1 | 1/2018 | Bauer et al. | | |
| 2018/0035350 A1 * | 2/2018 | Rahman | ................ | H04W 72/04 |
| 2018/0159653 A1 | 6/2018 | Johnson | | |
| 2019/0007886 A1 * | 1/2019 | Rahman | ................ | H04W 24/02 |
| 2019/0116500 A1 * | 4/2019 | Bendlin | ............... | H04W 64/003 |
| 2019/0320494 A1 * | 10/2019 | Jayawardene | .... | H04W 72/0453 |
| 2020/0178146 A1 * | 6/2020 | Rahman | ................ | H04W 36/14 |

FOREIGN PATENT DOCUMENTS

| | | |
|---|---|---|
| WO | 2009115554 A1 | 9/2009 |
| WO | 2010124724 A1 | 11/2010 |
| WO | 2013116802 A1 | 8/2013 |
| WO | 2015196129 A1 | 12/2015 |
| WO | 2016083524 A1 | 6/2016 |

* cited by examiner

RADIO ACCESS NETWORK RESOURCE CONFIGURATION FOR GROUPS OF MOBILE DEVICES

This application is a continuation of U.S. patent application Ser. No. 16/126,925, filed Sep. 10, 2018, now U.S. Pat. No. 10,555,235, which is a continuation of U.S. patent application Ser. No. 15/670,821, filed Aug. 7, 2017, now U.S. Pat. No. 10,075,890, which is a continuation of U.S. patent application Ser. No. 15/222,697, filed Jul. 28, 2016, now U.S. Pat. No. 9,730,135, all of which are herein incorporated by reference in their entirety.

The present disclosure relates generally to methods, computer-readable media and devices for activating antennas based upon a location and a movement of a group of mobile endpoint devices.

BACKGROUND

Upgrading a telecommunication network to a software defined network (SDN) architecture implies replacing or augmenting existing network elements that may be integrated to perform a single function with new network elements. The replacement technology may comprise a substrate of networking capability, often called network function virtualization infrastructure (NFVI) that is capable of being directed with software and SDN protocols to perform a broad variety of network functions and services. Different locations in the telecommunication network may be provisioned with appropriate amounts of network substrate, and to the extent possible, routers, switches, edge caches, middle-boxes, and the like may be instantiated from the common resource pool.

SUMMARY

In one example, the present disclosure discloses a device, computer-readable medium, and method for activating antennas based upon a location and a movement of a group of mobile endpoint devices. For example, a method may include a processor of a cellular network detecting a group of mobile endpoint devices associated with a first location and activating a first antenna at a first cell site of the cellular network associated with the first location, in response to detecting the group of mobile endpoint devices. The processor may further detect a movement of the group of mobile endpoint devices toward a second location, activate a second antenna at a second cell site of the cellular network associated with the second location, in response to detecting the movement of the group of mobile endpoint devices toward the second location, and deactivate the first antenna, in response to detecting the movement of the group of mobile endpoint devices toward the second location.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
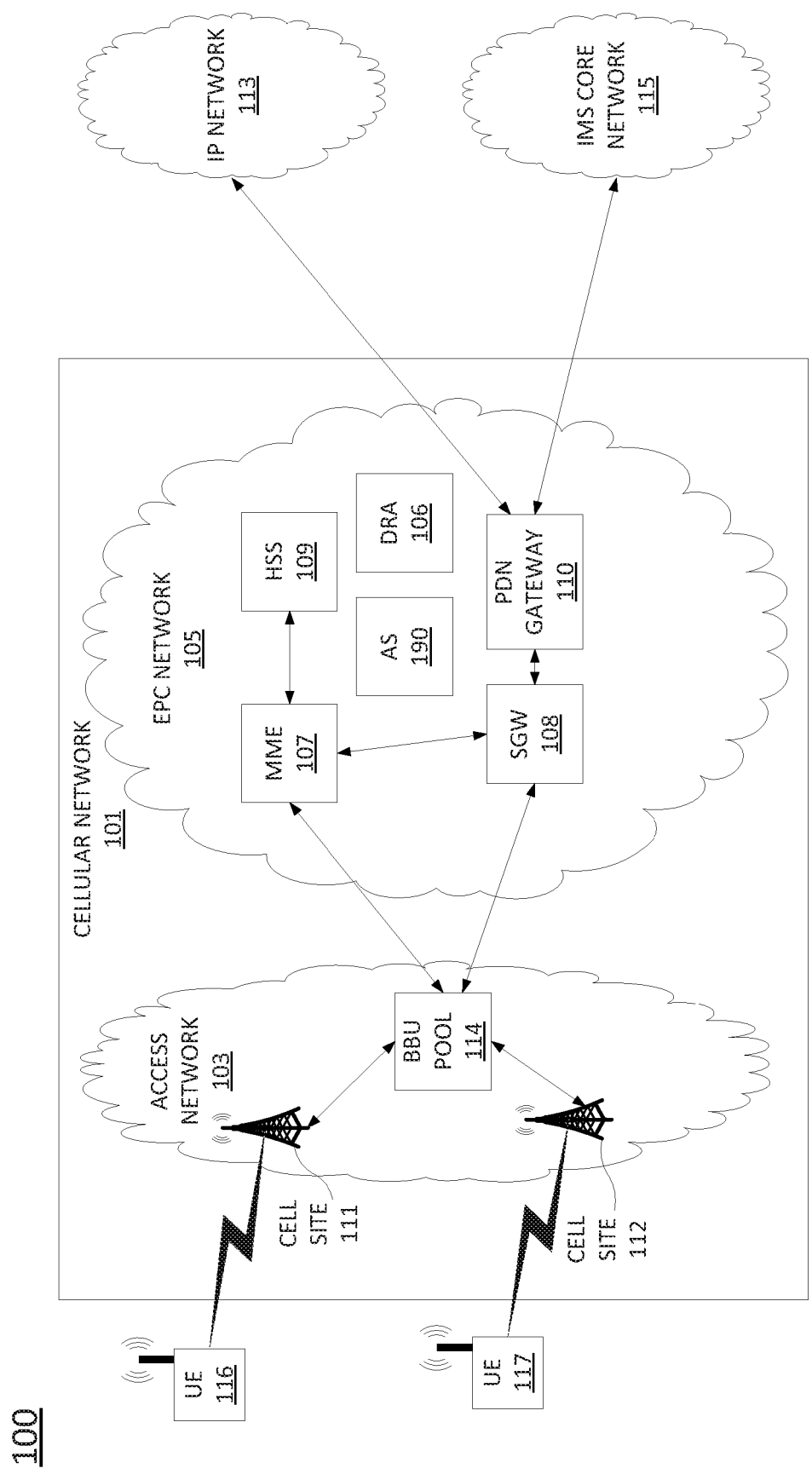
FIG. 1 illustrates an example system related to the present disclosure.

The present disclosure broadly discloses methods, computer-readable media and apparatuses for activating antennas based upon a location and a movement of a group of mobile endpoint devices. Examples of the present disclosure increase situational awareness within a cellular network by leveraging analytics to predict specific edge network location bandwidth needs and mitigating the bandwidth needs by invoking radio access network (RAN) and distributed core network self-optimizing network (SON) feature automation. Examples of the present disclosure utilize network operation and network device location data, in addition to mobile endpoint device data to predict consumption trends and the throughput density needs for popular applications and services. By tracking users' mobile endpoint devices, examples of the present disclosure estimate in real-time where, when, and how many mobile endpoint devices will need bandwidth, and the types and quantities of bandwidth that are needed. This information is collected in real-time such that a SON orchestrator may determine where and how many resources, such as remote radio heads and baseband units, should be activated at a given site. For example, the throughput density needs for the most popular applications or services can be predicted. As a consequence, the SON orchestrator may acquire enough information to allocate the access resources (e.g., remote radio heads and baseband units) to the relevant locations so that consumption peaks are absorbed smoothly without compromising quality of service (QoS), user experience, and customer satisfaction.

Examples of the present disclosure account for the capabilities and needs of mobile endpoint devices, in addition to the availability and locations of network resources. For instance, a mobile endpoint device may have multiple radios for communication via different frequency bands and/or utilizing different technologies. The mobile endpoint device may have all of its radios turned on, and may be connected to the appropriate network resources depending on what is nearby and what kind of application(s) is/are being used. In addition, in one example, a SON orchestrator may further include or coordinate with a software-defined network (SDN) controller to deploy additional network-based resources, such as virtual network functions (VNFs), or "virtual machines," instantiated on host devices. For instance, host devices, which may also be referred to as network function virtualization infrastructure (NFVI), may be configured or reconfigured to function as additional routers, gateways, switches, and the like to support the additional bandwidth and traffic that may result from the activation of the one or more additional antennas at a cell site.

Examples of the present disclosure may relate to detecting groups of mobile endpoint devices that are collocated and which are moving in a same direction, and activating or allocating network resources based upon the current location of the group, and based upon a detection of a movement of the group toward another location. In one example, the group of mobile endpoint devices may also be utilizing a same application or service, or similar applications or services. For instance, a large number of users may be participating in a parade or demonstration with a route through a city. During the parade, the users may take many pictures or videos and upload the media to social media accounts or media sharing sites, may send the media to friends and family via email, multimedia messaging, and so forth. The users may similarly place many phone calls during the event. In one example, the users may specifically be utilizing the same shared application that has been designated for use during the event, such as uploading pictures to a particular hashtag related to a group chat application.

Examples of the present disclosure may account for the aggregate bandwidth needs of the group of mobile endpoint devices by determining, e.g., by a SON orchestrator, the congregation of mobile endpoint devices at a first location and activating or allocating network resources based upon the number of devices, the actual or anticipated bandwidth utilizations of the mobile endpoint devices, and so forth. For instance, the SON orchestrator may activate one or more antennas/remote radio heads of a higher frequency band relative to antennas of lower frequency bands that may be available (e.g., using antennas for a 1900 MHz band instead of antennas for an 850 MHz band). For instance, the mobile endpoint devices in the group may primarily be outdoors where the 1900 MHz band better protects against inter-cell interference, and where the better in-building signal penetration of the 850 MHz band is less important. In another example, the group of mobile endpoint devices may primarily be engaged in voice calls or data usage (e.g., utilizing a multimedia messaging application) which may warrant utilizing the 850 MHz band or the 1900 MHz band, respectively. In one example, the SON orchestrator may further allocate one or more baseband units to the one or more antennas that are activated, e.g., in a cloud radio access network (RAN) environment. For instance, in a cloud RAN, the antennas/remote radio heads may be located on rooftops, or at the top of a cell site mast, whereas the baseband units may be located at an entirely different location, and where a pool of baseband units may be available to service multiple cell sites and/or multiple antennas/remote radio heads that may be deployed at different locations.

In one example, a SON orchestrator may further activate and allocate one or more antennas and baseband units associated with a different cell site as the group of mobile endpoint devices moves from one location to another. The SON orchestrator may further de-activate the antenna(s) at the first cell site and de-allocate the baseband unit(s) allocated to such antennas when the group of mobile endpoint devices has moved beyond the first location. It should be noted that the terms "activate" and "de-activate" encompass the scope of causing the antenna to be able to receive signals (e.g., the antenna is activated) and not be able to receive signals (e.g., the antenna is deactivated). Any number of approaches can be employed to bring about the activation and deactivation of an antenna, e.g., providing or removing power to the antenna, and so on. These and other aspects of the present disclosure are discussed in greater detail below in connection with the examples of FIGS. 1-4.

In addition, it should be noted that as referred to herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

To better understand the present disclosure, FIG. 1 illustrates an example network, or system 100 in which embodiments of the present disclosure for activating antennas based upon a location and a movement of a group of mobile endpoint devices may operate. In one example, the system 100 comprises a cellular network 101 (e.g., a 4G/Long Term Evolution (LTE) network), an IP network 113, and a core network, e.g., an IP Multimedia Subsystem (IMS) core network 115. In one example, system 100 is provided and operated by a cellular/wireless network operator. FIG. 1 also illustrates various mobile endpoint devices 116 and 117, e.g., user equipment or user endpoints (UE). The mobile endpoint devices UE 116 and 117 may each comprise a cellular telephone, a smartphone, a tablet computing device, a laptop computer, a pair of computing glasses, a wireless enabled wristwatch, or any other cellular-capable mobile telephony and computing device (broadly, "mobile endpoint devices").

In one example, the LTE network 101 comprises an access network 103 and a core network, Evolved Packet Core (EPC) network 105. In one example, the access network 103 comprises a cloud RAN. For instance, a cloud RAN is part of the 3rd Generation Partnership Project (3GPP) 5G specifications for mobile networks. As part of the migration of cellular networks towards 5G, a cloud RAN may be coupled to an EPC network until new cellular core networks are deployed in accordance with 5G specifications. In this regard, access network 103 may include cell sites 111 and 112 and a baseband unit (BBU) pool 114. In a cloud RAN, antennas, also referred to as remote radio heads, are deployed remotely from baseband units, e.g., atop cell site masts, buildings, and so forth. In one example, the BBU pool 114 may be located at distances as far as 20-80 kilometers or more away from the antennas/remote radio heads of cell sites 111 and 112 that are serviced by the BBU pool 114. It should also be noted in accordance with efforts to migrate to 5G networks, cell sites may be deployed with new antenna and radio infrastructures such as multiple input multiple output (MIMO) antennas, and millimeter wave antennas. In this regard, the cell, e.g., the footprint or coverage area of a cell site may in some instances be smaller than the coverage provided by NodeBs or eNodeBs of 3G-4G RAN infrastructure. For example, the coverage of a cell site utilizing one or more millimeter wave antennas may be 1000 feet or less.

In one example, the EPC network 105 provides various functions that support wireless services in the LTE environment. In one example, EPC network 105 is an Internet Protocol (IP) packet core network that supports both real-time and non-real-time service delivery across a LTE network, e.g., as specified by the 3GPP standards. In one example, all cell sites in the access network 103 are in communication with the EPC network 105 via baseband units in BBU pool 114. In operation, mobile endpoint device UE 116 may access wireless services via the cell site 111 and mobile endpoint device UE 117 may access wireless services via the cell site 112 located in the access network 103. It should be noted that any number of cell sites can be deployed in access network. In one illustrative example, the access network 103 may comprise one or more cell sites.

In EPC network 105, network devices such as Mobility Management Entity (MME) 107 and Serving Gateway (SGW) 108 support various functions as part of the LTE network 101. For example, MME 107 is the control node for the LTE access network. In one embodiment, MME 107 is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-cell handovers and as the anchor for mobility between LTE and other wireless technologies, such as 2G and 3G wireless networks.

In addition, EPC network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a public data network (PDN) gateway 110 which serves as a gateway that provides access between the EPC network 105 and various data networks, e.g., other IP networks 113, an IMS core network 115, and the like. The public data network gateway is also referred to as a PDN gateway, a PDN GW or a PGW. In addition, the EPC network 105 may include a Diameter routing agent (DRA) 106, which may be engaged in the proper routing of messages between other elements within EPC network 105, and with other components of the system 100, such as a call session control function (CSCF) (not shown) in IMS core network 115. For clarity, the connections between DRA 106 and other components of EPC network 105 are omitted from the illustration of FIG. 1.

In accordance with the present disclosure, any one or more of the components of EPC network 105 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 107 may comprise a vMME, SGW 108 may comprise a vSGW, and so forth. In this regard, the EPC network 105 may be expanded (or contracted) to include more or less components than the state of EPC network 105 that is illustrated in FIG. 1. For instance, EPC network 105 may be expanded to include additional PDN gateways, e.g., in the form of vPGWs, additional serving gateways (SGWs), e.g., in the form of vSGWs, and so forth. In one example, the SDN host devices may be deployed in one or more geographically diverse data centers. Accordingly, in one example, the network may be segregated into a number of zones, where different VNFs may be deployed in different zones depending upon the respective locations of the one or more data centers.

In one example, the EPC network 105 may also include an application server (AS) 190. In one example, AS 190 may function as a self-optimizing network (SON) orchestrator that is responsible for activating and deactivating, allocating and deallocating, and otherwise managing a variety of network components. For instance, AS 190 may activate and deactivate antennas/remote radio heads of cell sites 111 and 112, respectively, may allocate and deactivate baseband units in BBU pool 114, and may perform other operations for activating antennas based upon a location and a movement of a group of mobile endpoint devices, in accordance with the present disclosure. In one example, AS 190 may comprise a computing system, such as computing system 400 depicted in FIG. 4, and may be configured to provide one or more functions for activating antennas based upon a location and a movement of a group of mobile endpoint devices, and for performing various other operations in accordance with the present disclosure. For instance, AS 190 may be configured to perform functions such as those described below in connection with the example method 300 of FIG. 3. Accordingly, the AS 190 may be connected directly or indirectly to any one or more network elements of EPC network 105, and of the system 100 in general, that are configured to gather and forward network analytic information, such as signaling and traffic data, alarm data, and other information and statistics to AS 190 and to receive instructions from AS 190.

In one example, AS 190 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places. For example SDN nodes may reside in various data centers distributed in different locations. For example, a router may be instantiated on a SDN node, and released when the router is no longer needed. Similarly, a media server may be instantiated on a SDN node, and released when no longer needed. In one example, the configuring, releasing, and reconfiguring of SDN nodes is controlled by the SDN controller, which may store configuration codes, e.g., computer/processor-executable programs, instructions, or the like for various functions which can be loaded onto an SDN node. In another example, the SDN controller may instruct, or request an SDN node to retrieve appropriate configuration codes from a network-based repository, e.g., a storage device, to relieve the SDN controller from having to store and transfer configuration codes for various functions to the SDN nodes.

In accordance with the present disclosure, AS 190 may therefore control various components within EPC network 105 and/or within access network 103 to support the traffic that is accommodated by the activation of antennas/remote radio heads of cell sites 111 and 112, respectively and the allocation of baseband units in BBU pool 114. For instance, AS 190 (e.g., performing functions of a SON orchestrator) may activate an antenna of cell site 111 and assign a baseband unit in BBU pool 114 when a group of mobile endpoint devices is detected near the cell site 111. AS 190 (e.g., performing functions of a SDN controller) may further instantiate VNFs to function as routers, switches, gateways, and the like to ensure that sufficient backhaul resources are available for the traffic to transit the access network 103 and/or EPC network 105. In addition, as mentioned above, any one or more of the DRA 106, MME 107, SGW 108, HSS 109, and PGW 110 may comprise VNFs instantiated on host devices. As such, AS 190 may perform similar operations to instantiate, configure, reconfigure, and decommission such components in support of examples of the present disclosure for activating antennas based upon a location and a movement of a group of mobile endpoint devices. In one example, AS 190 may communicate with various components of EPC network 105 and access network 103 in order to gather information in support of operations for activating antennas based upon a location and a movement of a group of mobile endpoint devices. For instance, in one example, AS 190 may gather mobile endpoint device location information and mobile endpoint device application/service utilization information from cell sites 111 and 112. In one example, AS 190 may further gather status information regarding cell sites 111 and 112 and BBU pool 114. For example, AS 190 may obtain information regarding the current traffic loads at cell sites 111 and 112, daily and hourly peak traffic loads, the available bandwidth for active antennas, the number of deactivated antennas, and so forth, the current traffic load of allocated baseband units in BBU pool 114, the number of available baseband units that are not currently allocated, and so forth. Alternatively, or in addition, AS 190 may gather status information, such as a current load, a current capacity, a daily or hourly peak load, and so forth from MME 107, SGW 108, and/or PGW 110, where such information may be used by AS 190 to determine whether additional MMEs, SGWs, PGWs, and other intermediate components should be deployed to accommodate anticipated increases in traffic from a group of mobile endpoint devices. Due to the relatively large number of connections available between AS 190 and other network elements, none of the actual links to the application server are shown in FIG. 1. Similarly, intermediate devices and links between DRA 106, MME 107, SGW 108, eNodeBs 111 and 112, PDN gateway 110, and other components of system 100 are also omitted for clarity, such as additional routers, switches, gateways, and the like.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For instance, in one example, AS 190 may be spilt into separate components to operate as a SON orchestrator and a SDN controller, respectively. Similarly, although the AS 190 is illustrated as a component of EPC network 105, in another example AS 190, and/or other network components may be deployed in an IMS core network 115 instead of being deployed within the EPC network 105, or in other portions of system 100 that are not shown, while providing essentially the same functionality.

In addition, although aspects of the present disclosure have been discussed above in the context of a long term evolution (LTE)-based wireless network, examples of the present disclosure are not so limited. Thus, the teachings of the present disclosure can be applied to other types of wireless networks (e.g., a 2G network, a 3G network, a 5G network, an integrated network, e.g., including any two or more of 2G-5G infrastructure and technologies, and the like), that are suitable for use in connection with examples of the present disclosure for activating antennas based upon a location and a movement of a group of mobile endpoint devices. Thus, these and other modifications are all contemplated within the scope of the present disclosure.

Figure 2:
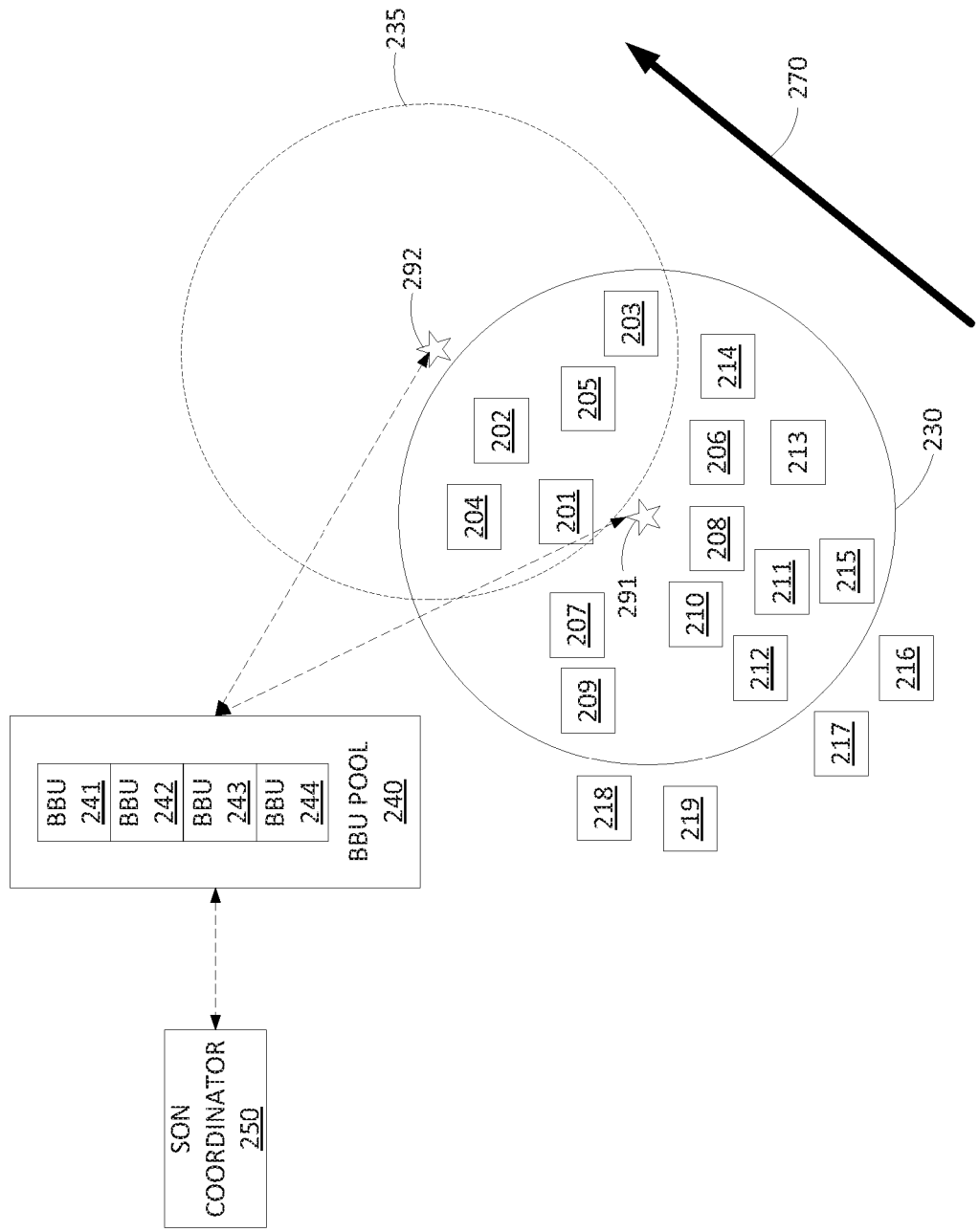
FIG. 2 illustrates an additional example system related to the present disclosure.

FIG. 2 illustrates an additional example network, or system 200 in which embodiments of the present disclosure for activating antennas based upon a location and a movement of a group of mobile endpoint devices may operate. In one example, system 200 may represent at least a portion of a cellular/wireless network. For instance, system 200 may represent certain self-optimizing network (SON) aspects of the network, or system 100 of FIG. 1. As illustrated in FIG. 2, system 200 may include a SON orchestrator 250, e.g., a server having at least a processor and a computer-readable medium storing instructions which, when executed by the processor, cause the processor to perform functions for activating antennas based upon a location and a movement of a group of mobile endpoint devices, and for performing various other operations in accordance with the present disclosure. In one embodiment, the SON orchestrator 250 may correspond to AS 190 of the example of FIG. 1. In one embodiment, the SON orchestrator 250 may comprise a computing system, such as computing system 400 depicted in FIG. 4. In one embodiment, the SON orchestrator 250 may comprise a plurality of devices that may be co-located, or in distributed locations, and that perform coordinated functions of an SON orchestrator, as described herein.

The system 200 may also include antennas 291 and 292, which may comprise components of different cell sites associated with different locations 230 and 235, respectively. In one example, the first location 230 and the second location 235 may comprise respective "geofences" surrounding the antenna 291 and the antenna 292, respectively. For instance, in one example, the first location 230 may comprise an RF coverage area of the antenna 291, and the second location 232 may comprise an RF coverage area of the antenna 292. Antennas 291 and 292 may also be connected to a BBU pool 240 with a number of baseband units (BBUs) 241-244. As illustrated in FIG. 1, the BBU pool 240 may be connected to the SON orchestrator 250. It should be noted that the links between antennas 291 and 292 and the BBU pool 240, and between BBU pool 240 and SON orchestrator 250 may be direct links, e.g., optical or electrical links without intervening components, or may include any number of intermediate devices, such as additional routers, switches, repeaters, and so forth. It should also be noted that although antennas 291 and 292 are illustrated in FIG. 2 as being connected to SON orchestrator via BBU pool 240, in another example, the SON orchestrator and antennas 291 and 292 may be connected via different paths with different links and/or intermediate devices, and which do not include BBU pool 240.

As further illustrated in FIG. 2, a number of mobile endpoint devices 201-219 may receive cellular services from the system 200. The SON orchestrator 250 may be in communication with the cell sites of antennas 291 and 292 to receive information regarding the locations of various mobile endpoint devices. For example, the SON orchestrator 250 may determine the locations of the mobile endpoint devices if the mobile endpoint devices transmit Global Positioning System (GPS) location readings to the SON orchestrator 250, or to another network-based device that is accessible to the SON orchestrator 250, or may determine the locations of the mobile endpoint devices in another way, such as using cellular base station triangulation techniques, or by estimating the locations of the mobile endpoint devices based upon received signal strength indicators (RSSIs), the serving base stations/cell sites, nearby Institute of Electrical and Electronics Engineers (IEEE) 802.11 access points or IEEE 802.15 beacons, and so forth. In one example, SON orchestrator 250 may further gather status information regarding the cell sites of antennas 291 and 292, and of BBU pool 240. For example, SON orchestrator 250 may obtain information regarding the current traffic loads at the cell sites, daily and hourly peak traffic loads, the available bandwidth for active antennas, the number of deactivated antennas, and so forth, the current traffic load of allocated baseband units in BBU pool 240, the number of available baseband units that are not currently allocated, and so forth.

In one example, SON orchestrator 250 may determine that a number of mobile endpoint devices may comprise a group at the first location 230. For example, SON orchestrator 250 may determine that mobile endpoint devices 201-215 are all at or within the first location 230, and thus may consider that all of mobile endpoint devices 201-215 are members of a group at the first location 230. In one example, SON orchestrator 250 may consider other factors in determining which mobile endpoint devices may comprise a group. For example, the SON orchestrator 250 may determine that mobile endpoint devices 201-215 are utilizing the same or similar applications or services, such as voice call applications, email applications, text messaging applications, multimedia messaging applications, social media applications, gaming applications, and so forth. In one example, SON orchestrator 250 may also determine that at least endpoint devices 201-215 comprise a group if the mobile endpoint devices 201-215 share a same general direction of movement. For example, mobile endpoint devices 201-215 may be determined to be moving in the direction indicated by the arrow 270. In one example, the direction(s) of movement of mobile endpoint devices may be determined using the same or similar information that is utilized to determine the positions of the mobile endpoint devices, e.g., using changes in GPS location information over time, or the like. It should be noted that in one example, the SON coordinator may also determine that mobile endpoint devices 216-219 are part of the group even though the mobile endpoint devices 216-219 are not strictly within the first region 230. For instance, mobile endpoint devices 216-219 may be observed to be nearby to other mobile endpoint devices that are within the group (e.g., mobile endpoint devices 201-215) and may also be observed to be moving in the same general direction as indicated by the arrow 270. Thus, in one example, mobile endpoint devices 216-219 may be sufficiently associated with mobile endpoint devices 201-215, e.g., in terms of being within a certain proximity, having a same general direction of movement, and/or having the same or similar application/service usage profile. However, for illustrative purposes, the present example will consider the group as including mobile endpoint devices 201-215 and excluding mobile endpoint devices 216-219.

In one example, the SON orchestrator 250 may determine the traffic load, or the anticipated traffic load of the group of mobile endpoint devices 201-215. For instance, a collective traffic load and/or network utilization level of the mobile endpoint devices 201-215 for a given time period may be used to predict the traffic load and/or network utilization level at a current or future time period. In particular, it may be assumed that the traffic load and/or network utilization level may continue to be the same for a time period of the same duration. In one example, the SON orchestrator 250 may determine that the traffic load and/or network utilization level relates to a particular application or service, or a class of applications or services. For instance, as mentioned above, the mobile endpoint devices 201-215 may be found to be utilizing the same or similar applications and/or the SON orchestrator may determine a most popular application being used among the mobile endpoint devices 201-215.

In addition, in one example, SON orchestrator 250 may allocate one or more antennas, e.g., antenna 291, and one or more baseband units, e.g., baseband unit 244, based upon the presence of the group of mobile endpoint devices 201-215 at the first location 230. For instance, when the group of mobile endpoint devices 201-215 is present at the first location 230 and when the anticipated traffic load and/or network utilization level may exceed the current capacity of a cell site associated with the first location 230, the SON orchestrator 250 may activate antenna 291. In addition, the SON orchestrator 250 may allocate baseband unit 244 to the antenna 291, as well as ensure that additional resources, such as backhaul links, are in place to support the baseband unit 244 and antenna 291. Accordingly, the system 200 may then provide network services to mobile endpoint devices 201-215 via antenna 291. It should be noted that one or more additional antennas and/or baseband units may be activated and/or allocated for groups of mobile endpoint devices at or near one or both of the cell sites associated with antennas 291 and 292, respectively. However, until such time as these additional resources are deployed, the mobile endpoint devices may communicate with network based devices, such as SON orchestrator 250 using other access network infrastructures, such as other currently active antennas as the respective cell sites, and so forth.

In one example, the antenna 291 is selected for activation based upon a type of application utilized by the mobile endpoint devices 201-215, e.g., a primary type of application, such a most popular application that is in use among the mobile endpoint devices in the group. For example, the antenna 291 may be selected from among a plurality of antennas at a cell site associated with the first location 230, wherein the plurality of antennas includes antennas for different frequency bands. To illustrate, the group of mobile endpoint devices 201-215 may primarily be engaged in voice calls or data usage (e.g., utilizing a multimedia messaging application) which may warrant utilizing an antenna for the 850 MHz band or the 1900 MHz band, respectively.

As mentioned above, SON orchestrator 250 may also determine a direction of movement of the group of mobile endpoint devices 201-215. For instance, the group of mobile endpoint devices 201-215 may generally be moving in the direction of arrow 270, e.g., toward the second location 235. In one example, the direction of movement of the group may be determined from location information of the mobile endpoint devices, as described above. However, in one example, SON orchestrator 250 may determine that the group of mobile endpoint devices 201-215 may be moving toward the second location 235 when it is detected that a threshold number of mobile endpoint devices from the group are present within a geofence associated with the second location 235. For instance, at an instant in time as illustrated in FIG. 2, endpoint devices 201-205 are also present at or within the second location 235. Thus, if a threshold is set at 30 percent of the group, it may be determined that at that instant in time as illustrated in FIG. 2, the group of mobile endpoint devices 201-215 is moving toward the second location 235.

In one example, SON orchestrator 250 may also activate one or more antennas of a cell site associated with the second location 235, e.g., antenna 292, and allocate one or more baseband units of BBU pool 240, e.g., BBU 243, to the antenna 292, when it is detected that the group of mobile endpoint devices 201-215 is moving toward the second location 235. For instance, when it is detected that the group of mobile endpoint devices 201-215 is moving toward the second location 235 and when the anticipated traffic load and/or network utilization level may exceed the current capacity of a cell site associated with the second location 235, the SON orchestrator 250 may activate antenna 292. In addition, the SON orchestrator 250 may allocate baseband unit 243 to the antenna 292, as well as ensure that additional resources, such as backhaul links, are in place to support the baseband unit 243 and antenna 292. Accordingly, the system

200 may then provide network services to mobile endpoint devices 201-215 via antenna 292. In addition, SON orchestrator 250 may deactivate antenna 291 and deallocate baseband unit 244 in conjunction with the activating of the antenna 292 and allocation of baseband unit 243, e.g., at or around the same time, or at a different time, such as when 60 percent of the group has moved to the second location 235 or when 60 percent of the group has left the first location 230, and so forth.

It should be noted that the foregoing describes just one example in connection with FIG. 2 for detecting a group of mobile endpoint devices that are collocated and which are moving in a same direction, and activating or allocating network resources based upon the current location of the group, and based upon a detection of a movement of the group toward another location. For instance, in a different example, additional antennas at each cell site associated with locations 230 and 235, and/or additional baseband units may be activated and allocated. In another example, different BBU pools may be available such that antennas 291 and 292 may be allocated baseband units from different BBU pools. Thus, these and other variations are all contemplated within the scope of the present disclosure.

Figure 3:
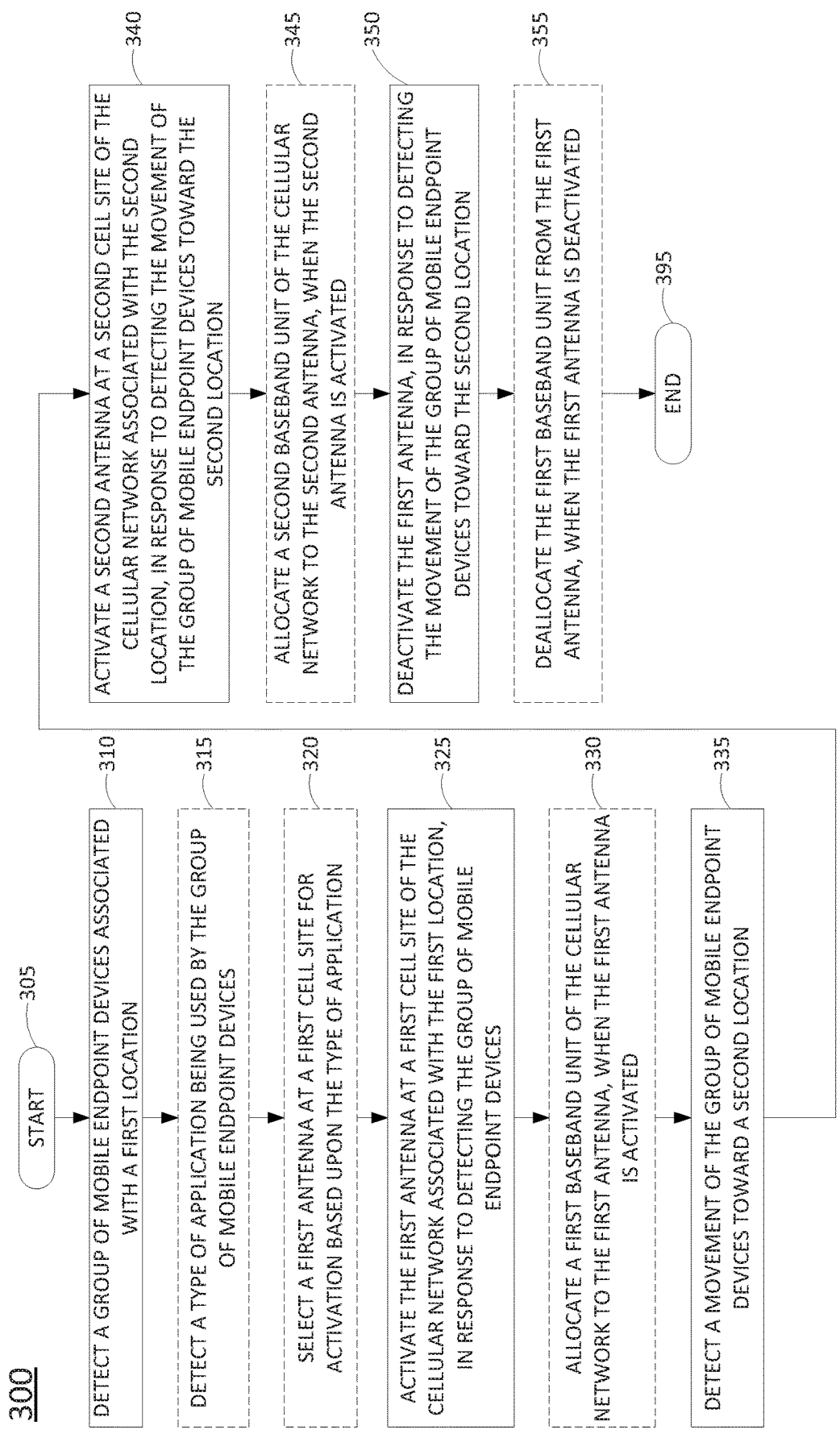
FIG. 3 illustrates a flowchart of an example method for activating antennas based upon a location and a movement of a group of mobile endpoint devices.

FIG. 3 illustrates a flowchart of an example method 300 for activating antennas based upon a location and a movement of a group of mobile endpoint devices. In one embodiment, the steps, operations or functions of the method 300 may be performed by any one or more of the components of the system 100 depicted in FIG. 1 or the system 200 of FIG. 2. For example, in one embodiment, the method 300 is performed by the application server (AS) 190. In another embodiment, the method 300 is performed by AS 190 in coordination with other components of the system 100. In another example, the method 300 is performed by SON orchestrator 250 of FIG. 2, or by SON orchestrator 250 in conjunction with other components of the system 200. Alternatively, or in addition, one or more steps, operations or functions of the method 300 may be implemented by a computing device having a processor, a memory and input/output devices as illustrated below in FIG. 4, specifically programmed to perform the steps, functions and/or operations of the method. Although any one of the elements in system 100 of FIG. 1 or system 200 of FIG. 2 may be configured to perform various steps, operations or functions of the method 300, the method will now be described in terms of an embodiment where steps of the method are performed by a processor, such as processor 402 in FIG. 4. For example, processor 402 may be deployed in a cellular network to perform the method 300.

The method 300 begins in step 305 and proceeds to step 310. In step 310, the processor detects a group of mobile endpoint devices associated with a first location. In one example, step 310 may include detecting a number of mobile endpoint devices greater than a threshold number of mobile endpoint devices having a same direction of movement and present at or within the first location, e.g., within a geofence associated with the first location, wherein the number of mobile endpoint devices comprises the group of mobile endpoint devices. In one example, the processor may determine the locations of the mobile endpoint devices from GPS location readings sent by the mobile endpoint devices to the processor or to another network-based device that is accessible to the processor, or may determine the locations of the mobile endpoint devices in another way, such as using cellular base station triangulation techniques, or by estimating the locations of the mobile endpoint devices based upon RSSIs, the serving base stations/cell sites, nearby IEEE 802.11 access points or IEEE 802.15 beacons, and so forth. In addition, in one example, the processor may determine the directions of movement of the mobile endpoint devices in the group using the same or similar information. For instance, the processor may determine the direction of movement for a mobile endpoint device based upon a change in location as indicated by GPS location information of the mobile endpoint device over a given time period.

At optional step 315, the processor may detect a type of application being used by the group of mobile endpoint devices. The type of application may be a primary application or service that is being used by the group of mobile endpoint devices, e.g., the most popular application or the most heavily utilized application among the mobile endpoint devices in the group. In one example, the processor may associate mobile endpoint devices with the group when the mobile endpoint devices are collocated, e.g., the devices are at the same location, have a same direction of movement, and are utilizing the same application or service, or the same type of application or service as the other mobile endpoint devices in the group. For instance, mobile endpoint devices that are using a group chat application, and which are collocated and have a same direction of movement may be considered to be in the group.

At optional step 320, the processor may select a first antenna at a first cell site for activation based upon the type of application. In one example, the first antenna may be selected from among a plurality of antennas at the first cell site, wherein the plurality of antennas includes antennas for different frequency bands. For example, the group of mobile endpoint devices may primarily be engaged in voice calls or data usage (e.g., utilizing a multimedia messaging application) which may warrant utilizing an antenna for the 850 MHz band or the 1900 MHz band, respectively. As such, optional step 320 may comprise selecting an antenna for one of the frequency bands based upon such criteria.

At step 325, the processor activates the first antenna at the first cell site of the cellular network associated with the first location, in response to detecting the group of mobile endpoint devices. For instance, the first antenna may be one of a plurality of antennas at the first cell site that may be deactivated, e.g., not in use and/or powered down, but which may be available to be activated and placed into service based upon a remote command from the processor.

At optional step 330, the processor may allocate a first baseband unit of the cellular network to the first antenna, when the first antenna is activated. For instance, the first baseband unit may be selected from a baseband unit pool that may include a plurality of baseband units that may be assigned to different antennas/remote radio heads, at one or more cell sites/base stations. The first baseband unit may be located at a base of the first cell site, or may be located 20-80 kilometers or more away from the first cell site and the first antenna. In one example, the processor may further instantiate VNFs to function as routers, switches, gateways, and the like to ensure that sufficient backhaul resources are available for the traffic of the group of mobile endpoint devices.

At step 335, the processor detects a movement of the group of mobile endpoint devices toward a second location. In one example, the movement of the group of mobile endpoint devices toward the second location is detected when a threshold number of endpoint devices from the group of mobile endpoint devices are present within a geofence associated with the second location, e.g., 25 percent of the group, 30 percent of the group, etc. The presence of the mobile endpoint devices at the second location may be determined using the same or similar information as discussed above, e.g., using GPS location readings, cellular base station triangulation techniques, RSSIs, the serving base stations/cell sites, nearby IEEE 802.11 access points or IEEE 802.15 beacons, and so forth.

At step 340, the processor activates a second antenna at a second cell site of the cellular network associated with the second location, in response to detecting the movement of the group of mobile endpoint devices toward the second location. In one example, step 340 may comprise the same or similar operations as discussed above in connection with step 325. For instance, the second antenna may be selected based upon a type of primary application being used by the group of mobile endpoint devices, an anticipated network load, etc.

At optional step 345, the processor may allocate a second baseband unit of the cellular network to the second antenna, when the second antenna is activated. In one example, optional step 345 may comprise the same or similar operations as discussed above in connection with optional step 330. In one example, the second baseband unit may be allocated from a same baseband unit pool as the first baseband unit. In another example, the second baseband unit may be allocated from a different baseband unit pool that may be physically located in a different location.

At step 350, the processor deactivates the first antenna, in response to detecting the movement of the group of mobile endpoint devices heading toward the second location. In one example, step 350 may be performed in coordination with step 340. In one example, step 350 may be performed when the movement of the group of mobile endpoint devices toward the second location is detected and when a sufficient portion of the group of mobile endpoint devices has left the first location, e.g., when 60 percent of the group has moved to the second location or when 60 percent of the group has left the first location, and so forth.

At optional step 355, the processor may deallocate the first baseband unit from the first antenna, when the first antenna is deactivated. As such, the first baseband unit may then be reassigned to a different antenna/remote radio head and/or shut down for an extended period of time to conserve power, and so on.

Following step 350, or following optional step 355, the method 300 may proceed to step 395 where the method ends.

In addition, although not specifically specified, one or more steps, functions, or operations of the method 300 may include a storing, displaying and/or outputting step as required for a particular application. In other words, any data, records, fields, and/or intermediate results discussed in the method 300 can be stored, displayed, and/or outputted either on the device executing the respective method or to another device, as required for a particular application. Furthermore, steps, blocks, functions, or operations in FIG. 3 that recite a determining operation or involve a decision do not necessarily require that both branches of the determining operation be practiced. In other words, one of the branches of the determining operation can be deemed as an optional step. Moreover, steps, blocks, functions, or operations of the above described method 300 can be combined, separated, omitted, and/or performed in a different order from that described above, without departing from the examples of the present disclosure.

Figure 4:
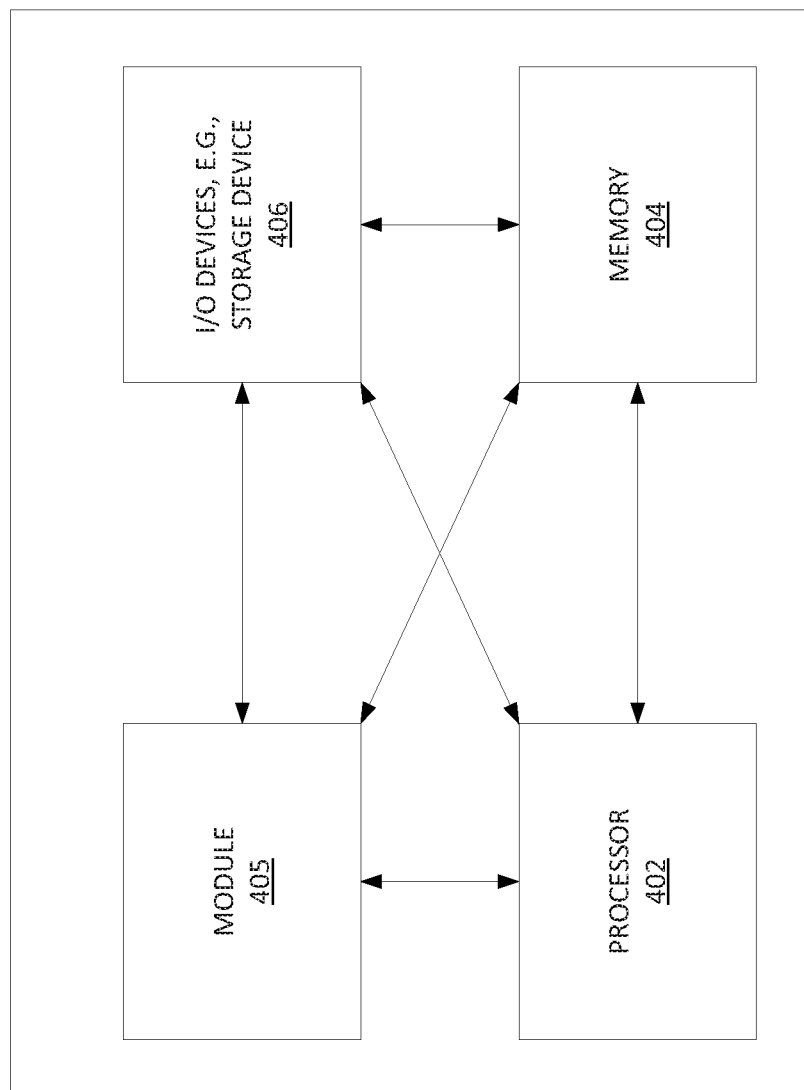
FIG. 4 illustrates a high-level block diagram of a computing device specially configured to perform the functions, methods, operations and algorithms described herein.

FIG. 4 depicts a high-level block diagram of a computing device specifically programmed to perform the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for activating antennas based upon a location and a movement of a group of mobile endpoint devices, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., certain steps of the above method 300, or the entire method 300 is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one embodiment, instructions and data for the present module or process 405 for activating antennas based upon a location and a movement of a group of mobile endpoint devices (e.g., a software program comprising computer-executable instructions) can be loaded into memory 404 and executed by hardware processor element 402 to implement the steps, functions or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for activating antennas based upon a location and a movement of a group of mobile endpoint devices (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server. As such, the use of the terms "computer-readable storage device" or "computer-readable storage medium" affirmatively exclude the scope of encompassing a signal per se.

While various embodiments have been described above, it should be understood that they have been presented by way of example only, and not a limitation. Thus, the breadth and scope of a preferred embodiment should not be limited by any of the above-described example embodiments, but should be defined only in accordance with the following claims and their equivalents.

What is claimed is:

1. A device comprising:
   a processor of a cellular network; and
   a computer-readable medium storing instructions which, when executed by the processor, cause the processor to perform operations, the operations comprising:
   detecting a group of mobile endpoint devices associated with a first location;
   activating a first baseband unit at a first cell site of the cellular network associated with the first location, in response to the detecting the group of mobile endpoint devices;
   detecting the group of mobile endpoint devices to be within a geofence of a second location;
   activating a second baseband unit at a second cell site of the cellular network associated with the second location, in response to the detecting the group of mobile endpoint devices being within the geofence of the second location; and
   deactivating the first baseband unit, in response to the detecting the group of mobile endpoint devices being within the geofence of the second location.

2. The device of claim 1, wherein the operations further comprise:
   allocating a first antenna of the cellular network to the first baseband unit, when the first baseband unit is activated; and
   deallocating the first antenna from the first baseband unit, when the first baseband unit is deactivated.

3. The device of claim 2, wherein the operations further comprise:
   allocating a second antenna of the cellular network to the second baseband unit, when the second baseband unit is activated.

4. The device of claim 1, wherein the detecting the group of mobile endpoint devices associated with the first location comprises:
   detecting a number of mobile endpoint devices greater than a threshold number of mobile endpoint devices having a same direction of movement and being present within a geofence associated with the first location, wherein the number of mobile endpoint devices comprises the group of mobile endpoint devices.

5. The device of claim 1, wherein the group of mobile endpoint devices being within the geofence of the second location is detected when a threshold number of mobile endpoint devices from the group of mobile endpoint devices are present within the geofence of the second location.

6. The device of claim 1, wherein the operations further comprise:
   detecting a type of application being used by the group of mobile endpoint devices; and
   selecting the first baseband unit at the first cell site for activation based upon the type of application.

7. The device of claim 6, wherein the first baseband unit is selected from among a plurality of baseband units at the first cell site.

8. A method comprising:
   detecting, by a processor of a cellular network, a group of mobile endpoint devices associated with a first location;
   activating, by the processor, a first baseband unit at a first cell site of the cellular network associated with the first location, in response to the detecting the group of mobile endpoint devices;
   detecting, by the processor, the group of mobile endpoint devices to be within a geofence of a second location;
   activating, by the processor, a second baseband unit at a second cell site of the cellular network associated with the second location, in response to the detecting the group of mobile endpoint devices being within the geofence of the second location; and
   deactivating, by the processor, the first baseband unit, in response to the detecting the group of mobile endpoint devices being within the geofence of the second location.

9. The method of claim 8, further comprising:
   allocating a first antenna of the cellular network to the first baseband unit, when the first baseband unit is activated; and
   deallocating the first antenna from the first baseband unit, when the first baseband unit is deactivated.

10. The method of claim 9, further comprising:
    allocating a second antenna of the cellular network to the second baseband unit, when the second baseband unit is activated.

11. The method of claim 8, wherein the detecting the group of mobile endpoint devices associated with the first location comprises:
    detecting a number of mobile endpoint devices greater than a threshold number of mobile endpoint devices having a same direction of movement and being present within a geofence associated with the first location, wherein the number of mobile endpoint devices comprises the group of mobile endpoint devices.

12. The method of claim 8, wherein the group of mobile endpoint devices being within the geofence of the second location is detected when a threshold number of mobile endpoint devices from the group of mobile endpoint devices are present within the geofence of the second location.

13. The method of claim 8, further comprising:
    detecting a type of application being used by the group of mobile endpoint devices; and
    selecting the first baseband unit at the first cell site for activation based upon the type of application.

14. The method of claim 13, wherein the first baseband unit is selected from among a plurality of baseband units at the first cell site.

15. A tangible computer-readable medium storing instructions which, when executed by a processor of a cellular network, cause the processor to perform operations, the operations comprising:
    detecting a group of mobile endpoint devices associated with a first location;
    activating a first baseband unit at a first cell site of the cellular network associated with the first location, in response to the detecting the group of mobile endpoint devices;

detecting the group of mobile endpoint devices to be within a geofence of a second location;

activating a second baseband unit at a second cell site of the cellular network associated with the second location, in response to the detecting the group of mobile endpoint devices being within the geofence of the second location; and deactivating the first baseband unit, in response to the detecting the group of mobile endpoint devices being within the geofence of the second location.

16. The tangible computer-readable medium of claim 15, wherein the operations further comprise:

allocating a first antenna of the cellular network to the first baseband unit, when the first baseband unit is activated; and deallocating the first antenna from the first baseband unit, when the first baseband unit is deactivated.

17. The tangible computer-readable medium of claim 16, wherein the operations further comprise:

allocating a second antenna of the cellular network to the second baseband unit, when the second baseband unit is activated.

18. The tangible computer-readable medium of claim 15, wherein the detecting the group of mobile endpoint devices associated with the first location comprises:

detecting a number of mobile endpoint devices greater than a threshold number of mobile endpoint devices having a same direction of movement and being present within a geofence associated with the first location, wherein the number of mobile endpoint devices comprises the group of mobile endpoint devices.

19. The tangible computer-readable medium of claim 15, wherein the group of mobile endpoint devices being within the geofence of the second location is detected when a threshold number of mobile endpoint devices from the group of mobile endpoint devices are present within the geofence of the second location.

20. The tangible computer-readable medium of claim 15, wherein the operations further comprise:

detecting a type of application being used by the group of mobile endpoint devices; and selecting the first baseband unit at the first cell site for activation based upon the type of application.

* * * * *